(12) United States Patent
Yasutaka et al.

(10) Patent No.: US 8,387,045 B2
(45) Date of Patent: Feb. 26, 2013

(54) CLONING IMAGE CREATION USING VIRTUAL MACHINE ENVIRONMENT

(75) Inventors: Nishimura Yasutaka, Kanagawa-ken (JP); Takahito Tashiro, Kanagawa-ken (JP); Jiroh Yamashita, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 1021 days.

(21) Appl. No.: 12/402,850

(22) Filed: Mar. 12, 2009

(65) Prior Publication Data

US 2010/0235828 A1    Sep. 16, 2010

(51) Int. Cl.
G06F 9/455 (2006.01)
G06F 15/16 (2006.01)
G06F 11/00 (2006.01)
G06F 9/445 (2006.01)

(52) U.S. Cl. .................. 718/1; 705/3; 709/227; 714/15; 717/174; 717/176

(58) Field of Classification Search ........................ None
See application file for complete search history.

(56) References Cited

U.S. PATENT DOCUMENTS

| | | | |
|---|---|---|---|
| 7,356,679 B1* | 4/2008 | Le et al. | 717/176 |
| 7,539,899 B1* | 5/2009 | Wang | 714/15 |
| 7,577,722 B1* | 8/2009 | Khandekar et al. | 718/1 |
| 2005/0193245 A1 | 9/2005 | Hayden et al. | |
| 2006/0089995 A1* | 4/2006 | Kerr et al. | 709/227 |
| 2007/0006225 A1* | 1/2007 | McAlister et al. | 718/1 |
| 2007/0168478 A1 | 7/2007 | Crosbie | |
| 2008/0104588 A1* | 5/2008 | Barber et al. | 718/1 |
| 2008/0144725 A1* | 6/2008 | Henocq et al. | 375/240.27 |
| 2008/0307414 A1* | 12/2008 | Alpern et al. | 718/1 |
| 2009/0144725 A1* | 6/2009 | Vrhel Jr. | 717/174 |
| 2009/0204965 A1* | 8/2009 | Tanaka et al. | 718/1 |
| 2009/0265706 A1* | 10/2009 | Golosovker et al. | 718/1 |
| 2009/0282404 A1* | 11/2009 | Khandekar et al. | 718/1 |
| 2009/0307689 A1* | 12/2009 | Sudhakar | 718/1 |
| 2010/0191545 A1* | 7/2010 | Heinert et al. | 705/3 |

FOREIGN PATENT DOCUMENTS

| | | |
|---|---|---|
| JP | 2005-322243 | 11/2005 |
| JP | 2006-221649 | 8/2006 |
| JP | 2007-226287 | 9/2007 |

OTHER PUBLICATIONS

J. Zackrisson et al., OpenLabs Security Laboratory—The Online Security Experiment Platform, vol. 4 Jul. 2008, [Retrieved on Oct. 15, 2012]. Retrieved from the internet: <URL: http://btu.se/fou/forskinfo.nsf/all/49fbdc71951aa12ac12574aa005040b2/$file/580-2039-1-PB.pdf> 6 Pages (63-68).*

Audrey Rasmussen, "IBM Tivoli Provisioning Manager: An Evolutionary Leap toward Automated Provisioning", Ptak, Noel & Associates, The Authority in IT Convergence Strategies, Dec. 2006, pp. 1-8, IBM Corporation, Armonk,NY.

* cited by examiner

Primary Examiner — Don Wong
Assistant Examiner — Anibal Rivera
(74) Attorney, Agent, or Firm — Yudell Isidore Ng Russell PLLC (57) ABSTRACT

Systems, methods, and computer programs for creating a cloning image using a pseudo environment in a virtual machine. The pseudo environment is configured based on an inventory of the assets of a reference machine. The cloning image can be deployed to one or more target machines.

17 Claims, 4 Drawing Sheets

CLONING IMAGE CREATION USING VIRTUAL MACHINE ENVIRONMENT

BACKGROUND

1. Technical Field

Embodiment of the invention disclosed generally relate to systems and associated methods for facilitating configuration and maintenance of computer network assets. In particular, embodiments of the invention are directed to provisioning computing devices using cloning and visualization techniques.

2. Description of the Related Art

Some computer networks use a large number of servers to provide services to client computers. To prevent the servers from becoming outdated, regular updating of the hardware or the software of the servers is performed. For example, updates can add new features to, update, the versions of add patches to, or perform other modifications or maintenance to the operating system of one or more of the servers. However, maintaining or updating a large number of servers can be costly and time consuming.

To facilitate the task of updating servers, it is known to use virtual machines. In general terms, a virtual machine is software configured to simulate a physical computing system. A virtual machine is allocated memory in a hardware layer, a virtual processor having one or more virtual central processing units, and virtual, input or output (I/O) devices. A virtual machine can be used on a host computing device to mimic the characteristics of a processor that is different in type from the native processor of the host computing device. Multiple virtual machines can share the underlying physical resources of the hardware layer of a computing device that hosts the virtual machines. The use of virtual machines permits multiple operating systems and programs to run on a single physical computer at the same time. Each virtual machine typically hosts its own applications in a fully isolated environment, with each operating system executing independently as if it were operating on a single dedicated computing system. In some cases, a virtual machine is configured to emulate an entire computing system by emulating specific hardware characteristics and being configured with specific software applications.

Recently, the creation and management of virtual machines has been called platform visualization. Platform virtualization is performed on a given hardware platform by host software which creates virtual machines for guest software. The guest software, which is often itself a complete operating system, runs as if it were installed on a stand-alone hardware platform. The guest system often requires access to specific devices to function. Hence, the virtual machine is configured to support the interfacing of the guest system to devices such as hard disk drives or network interface devices, for example. Virtual machines can be used for replacing outdated servers, providing redundant servers for disaster recovery, replacing outdated hardware with new hardware, and the like.

The maintenance and updating of assets in computing networks is also facilitated by the use of cloning techniques. In general terms, disk cloning technology copies the contents of one computer hard disk to another or to an "image" (a file). Often, the contents of the first disk are written to an image file as an intermediate step, and the second disk is loaded with the contents of the image file. Current cloning technology generally copies the contents (particularly, the operating system and desired applications) of a computer system's disk, keeps the state of the computer system at a given point in time, and deploys an image of the disk. Known commercial products in this technology area include Tivoli Provisioning Manager (TPM) for OS Deployment, Norton Ghost Solution Suite, and Acronis TrueImage.

Disk cloning software has several uses. Reboot and restore is a technique in which the disk of a computer is automatically wiped and restored from a "clean" master image. In provisioning, client computers are provided with a software suite so that a client computer is ready to be used without delay in installing individual applications. In full system backup a comprehensive backup of an operating system and installed software can be made. In system recovery an original equipment manufacturer can provide media that can restore a computer to its original factory software configuration.

Although it is known to transfer an image of an existing computer system to another, the provision in a large network of the same or similar computing environment in terms of functionality, including user and software settings, legacy software functionality, legacy peripherals functionality, and the like, presents significant difficulties.

SUMMARY OF ILLUSTRATIVE EMBODIMENTS

Disclosed are systems, methods, and computer programs for creating a cloning image using a pseudo environment in a virtual machine. The pseudo environment is configured based on an inventory of the assets of a reference machine. The cloning image can be deployed to one or more target machines.

In one aspect, the invention is directed to a method of creating a cloning image. The method comprises determining an Inventory of assets of a reference machine, the assets including hardware devices and software modules. The method further includes instantiating a virtual machine based on the inventory, and configuring a hardware pseudo-environment in the virtual machine based on device drivers and information required for operating system (OS) installation, said information including at least one of a device name, interrupt request (IRQ), peripheral component interconnect (PCI) slot number, and memory address. In one embodiment, the method also includes creating mock objects for components not required to be installed or connected to the reference machine, as well as running a compatibility mode for components required to be installed or connected to the reference machine. The method can further include installing at least one of an OS, device driver, and patch on the virtual machine. In some embodiments, the method additionally includes validating a behavior of at least one of an OS, device, driver, or patch in the virtual machine. Other features of the method can include acquiring a cloning image front the virtual machine without stopping the reference machine, and deploying the cloning image to a target machine.

In some embodiments, instantiating a virtual machine comprises instantiating a virtual machine in a deployment server, wherein the deployment server is a computing device different from the reference machine. The inventive methods can also include providing an emulator for devices required to be connected to the reference machine. In one embodiment, an emulator for a video graphics array device is provided. In another ease, an emulator for an integrated drive electronics memory device can be provided. The methods can also include creating a mock object for a universal serial bus (USB) device.

The above as well as additional features and advantages of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF ILLUSTRATIVE EMBODIMENTS

Disclosed are systems, methods, and computer programs for creating a cloning image using a pseudo environment in a virtual machine. The pseudo environment is configured based on an inventory of the assets of a reference machine. The cloning image can be deployed to one or more target machines.

In the following detailed description of exemplary embodiments of the invention, specific exemplary embodiments in which the invention may be practiced are described in sufficient detail to enable those skilled in the relevant technology to practice the invention, and it is to be understood that other embodiments may be used and that logical, architectural, programmatic, mechanical, electrical, and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figures. The specific reference numerals used are provided only to aid in the description and not meant to imply any limitations (structural or functional) on the invention. Unless otherwise explicitly stated, it is understood that the use of specific component, device, or parameter names are exemplary only and not meant to imply any limitations on the invention. The invention can be implemented with different terminology used to describe the components, devices, or parameters herein. Each term used herein is to be given its broadest interpretation given the context in which that term is used.

As used here, the word "or" is generally used in the sense of "and/or". That is, the use of "or" in a list, for example, is not used in the exclusive sense. Hence, in a list of A, B, C, or D, "or" indicates that a selection from the list could be A, B, C, and D, or A and B, or A and C, or B and D, or just A, just B, just C, just D, and so on. The exclusive sense of "or" will be explicitly pointed out or be clearly identifiable in the context of a description. The exclusive sense of "or" refers to a meaning of "or" whereby a list of A, B, or C indicates that selection of one item excludes the others. That is, for example, if A is selected, then B and C are excluded from the selection.

As used here, the terms "reference computer" and "reference computing environment" are synonymous and each refers to a computer system or device that is used as a reference point (in terms of assets and configuration) for building a virtual copy, identical or similar, of the reference computing environment in a virtual machine. The term "target computer" refers to a computing device that receives a cloning image. Depending on the context, a reference computer and a target computer can each be a "client computer" in a server-client, networked, computer environment.

In general terms, embodiments of the disclosed invention facilitate the creation of a cloning image based on a reference computing environment. The cloning image can be deployed to one or more target computers of a computer network. In one embodiment, a reference computing environment is obtained by making an inventory of the assets and configuration of a reference computer. A substantially similar replica of the reference computing environment is made on a virtual machine. The virtual machine can be hosted on, for example, a deployment server. In virtualizing the hardware of the reference computing environment, mock objects are created for devices that do not need to be connected to the reference computer. For devices that must be connected to the reference computer, a compatibility mode or an emulator of the device is provided. After configuration of the virtual hardware in the virtual machine, an operating system, device drivers, software patches, or other desired software is installed. The replicated and modified computing environment is validated. A cloning image of die virtual-machine based computing environment is created. The cloning image can be used for deployment to target computers in a network. The cloning image can be used for maintenance or safety failover. Embodiments of the invention can reduce system down time by allowing updating and maintenance the system without affecting the running of the reference computer. Also, a system administrator can support, manage, or update different types of operating systems.

Figure 1:
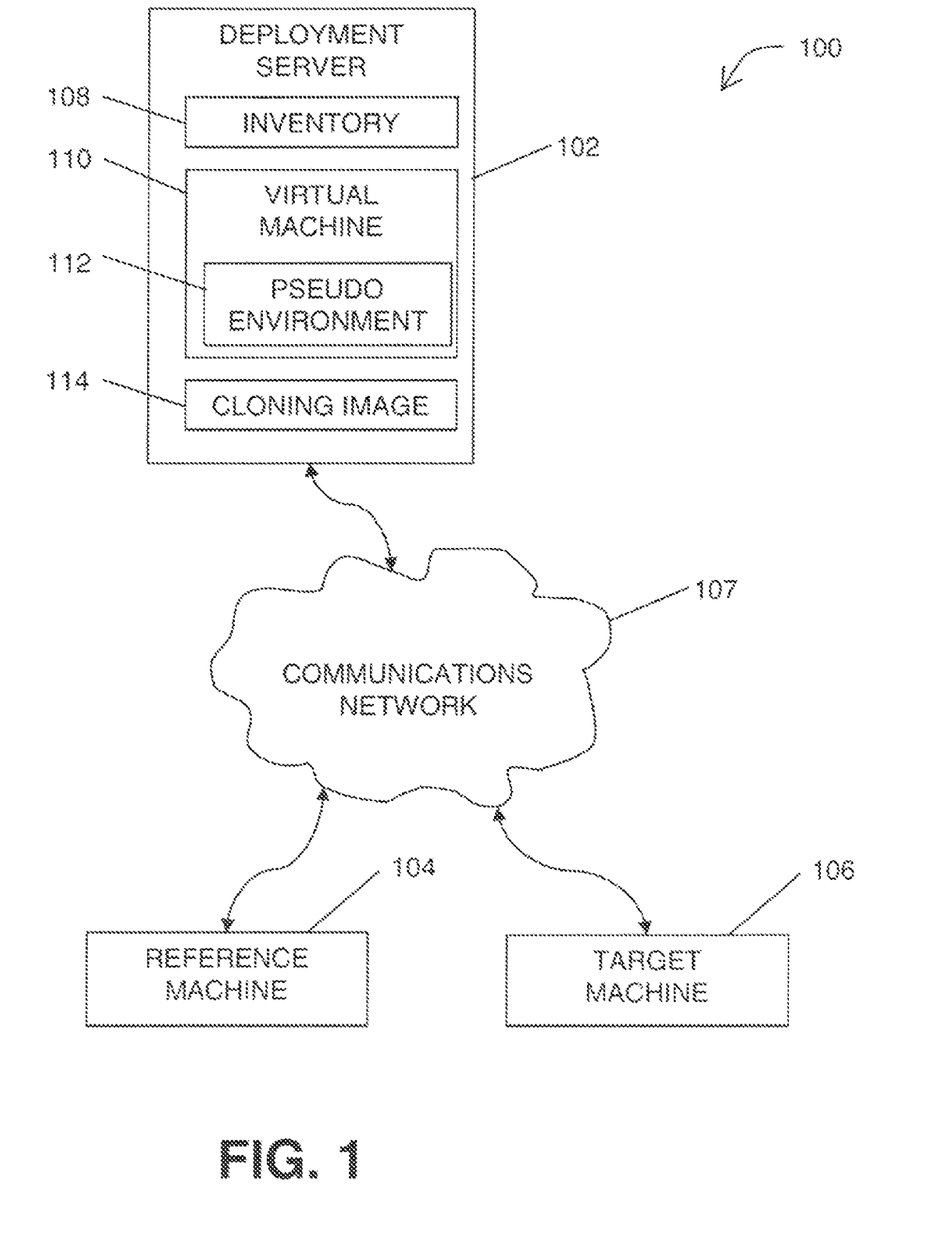
FIG. 1 is a high level schematic diagram of a networked computing environment configured with hardware and software components for implementing embodiments of the invention.

FIG. 1 illustrates networked computing environment 100, in which embodiments of the invention can be implemented. Networked computing environment 100 includes deployment server 102, reference computer 104, and target computer 106 in communication between or among each other via communications network 107. Communications network 107 can be one or more cooperating networks of computers, telephone signals switching stations, satellite links, cellular phone towers, etc., configured to facilitate transmission of data signals between or among deployment server 102, and reference computer 104, and target computer 106. In one embodiment, communications network 107 is the Internet, which is a worldwide collection of networks and gateways that use the Transmission Control Protocol/Internet Protocol (TCP/IP) suite of protocols to communicate with one another. In other embodiments, communications network 107 can be a virtual private network, intranet, local area network, wide area network, etc. Although FIG. 1 shows only one of each of deployment server 102, reference machine 104, and target machine 106, it is understood that networked computing environment 100 can include multiple instances of each of deployment server 102, reference machine 104, and target machine 106. The examples depicted and discussed are not meant to imply any specific architectural or network limitations with respect to the present invention.

Deployment server 102, reference computer 104, and target computer 106 can each be any computing device capable of transmitting and receiving communication signals. In a preferred embodiment, reference computer 104 and target computer 106 are personal computing devices such as laptops, desktops, etc., mobile computing devices, or any device having computing functionality. In one embodiment, deployment server 102 is a server computer. Deployment server 102, reference computer 104, and target computer 106 can each be a computing device such as data processing system 200 shown in FIG. 2. In other embodiments, deployment server 102, reference computer 104, and target computer 106 each can be any of a mobile telephone, cellular phone, radio phone, personal digital assistant smart phone, etc. Preferably, deployment server 102 includes computer program code for obtaining inventory 108 of reference computer 104, instantiating virtual machine 110 that provides pseudo environment 112, and creating cloning image 114 from virtual machine 110, all of which will be described further below.

In one implementation, deployment server 102 communicates over communications network 107 with reference machine 104 to obtain inventory 108 of the hardware and software assets of reference machine 104. In one embodiment, obtaining inventory 108 also involves assessing and recording the state of reference machine 104. Based on inventory 108, deployment server 102 instantiates virtual machine 110 that provides pseudo-environment 112, which is a virtual replica—or substantially similar virtual configuration of—the hardware configuration of reference machine 104. Pseudo environment 112 is provided with software that is either substantially similar to the software of reference machine 104 or that has been modified. For example, pseudo environment 112 can be provided with substantially the same operating system as present in reference machine 104, or the operating system of reference machine 104 having upgrades, software patches, modifications, etc. Cloning image 114 is created based on virtual machine 110. Cloning image 114 can be deployed to one or more of target machine 106.

Figure 2:
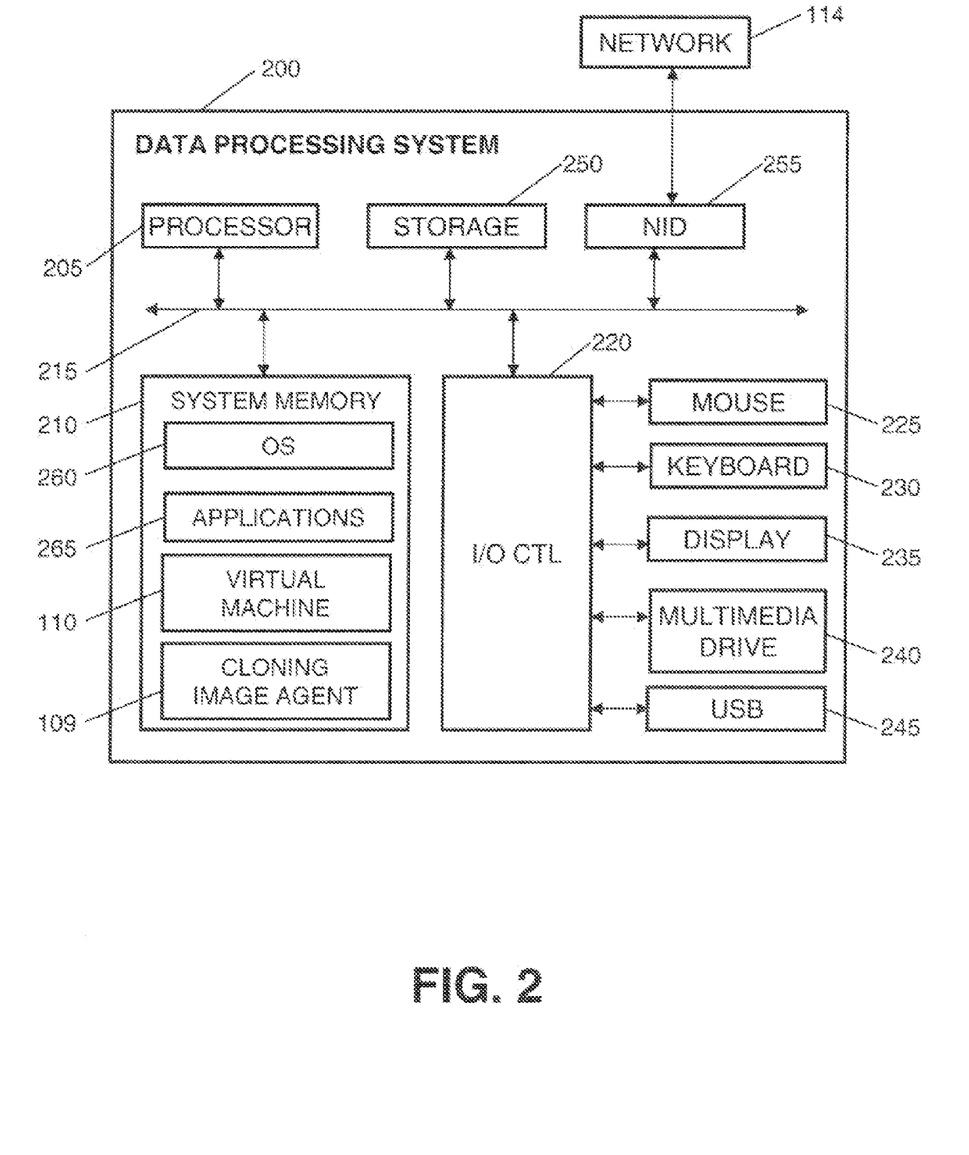
FIG. 2 is a block, schematic diagram of a data processing system that can be used in the networked computing environment of FIG. 1.

FIG. 2 depicts a block diagram of data processing system 200. Data processing system 200 is an exemplary computing device that can be used as any of deployment server 102, reference machine 104, or target machine 106. In one embodiment, data processing system 200 includes at least one processor 205 coupled to system, memory 210 via system bus 215. System memory 210 is a lowest level of memory and may include, for example, DRAM, flash memory, etc. Data processing system 200 can include additional volatile memory, such as cache memory, registers, and buffers, I/O controller 220 is coupled to system bus 215 and provides connectivity and control for input devices, such as mouse 225 and keyboard 230, and output devices, such as display 235. Multimedia drive 240 (for example, CDRW or DVD drive) and universal serial bus (USB) hub 245 can be coupled to I/O controller 220. Multimedia drive 240 and USB hub 245 may operate as both input and output (storage) mechanisms. Data processing system 200 can also include storage 250, within which data, instructions, or code can be stored. Network Interface device (NID) 255, coupled to system bus 215, enables data processing system 200 to connect to an access network, such as communications network 107.

In addition to the above described hardware components of data processing system 200, various features can be provided via software or firmware code or logic stored in system memory 210, or other data storage (for example, storage 250), and executed by processor 205. In one embodiment, data, instructions, or code from storage 250 populates the system memory 210. Thus, system memory 210 can include software or firmware components, such as operating system (OS) 260, applications 265, cloning image agent 109, and virtual machine 110. Cloning image agent 109 can include software components for supporting inventory 108, cloning image 114, and even virtual machine 110. OS 260 can be, for example, Microsoft Windows®, GNU®, Linux®, or Advanced Interactive executive (AIX®). Applications 265 can Include software components, utilities, etc, that cooperate with OS 260, cloning image agent 108, or virtual machine 110 to facilitate the provision of the functionality of the inventive embodiments disclosed here. In one embodiment, applications 265 include a visualization generator (not shown) configured to generate virtual machine 110 according to inventory 108. That is, the virtualization generator provides, in deployment server 102, a virtual instance of the physical (hardware) and/or software assets of reference machine 104. Virtual machine 110 interacts via a visualization layer (supported or controlled by the virtualization generator) with the hardware layer of data processing system 200, which hardware layer includes processor 205, system memory 210, I/O devices 225-245, and NID 255, for example.

In actual implementation applications 265, cloning image agent 109, and virtual machine 110 may be combined as a single application collectively providing the various functions of each individual software component when processor 205 executes the corresponding code. For simplicity, cloning image agent 109, and virtual machine 110 are illustrated and described as stand alone software or firmware components, which are stored in system memory 210 to provide or support the specific inventive functions described herein. In some embodiments, however, components or code of OS 260 may be combined with that of cloning image agent 109 and virtual machine 110, collectively providing the various functional features of the invention when processor 205 executes the corresponding code.

In certain embodiments, processor 205 executes applications 265, cloning image agent 109, virtual machine 110, and OS 260, which supports the user interface features of cloning image agent 109 and virtual machine 110. In some embodiments, cloning image agent 109 provides several graphical user interfaces (GUI) to enable user interaction with, or manipulation of, the functional features of cloning image agent 109. It is noted that, depending on the specifics of any given configuration, each of reference machine 104 and target machine 106 can be provided with a general computing architecture based on data processing system 200. However, the hardware or software functionality comprised by each of reference machine 104 and target machine 106 can be customized for a specific user, use, or environment. As will be particularly described below, in one embodiment, deployment server 102 is provided with cloning image agent 109 for creating and deploying cloning image 114 based on virtual machine 110 being configured to replicate the computing environment of reference machine 104. Among exemplary software code provided by cloning image agent 109 is software code for; (a) obtaining inventory 108 of reference machine 104; (b) based, on inventory 108, creating virtual machine 110 to support pseudo environment 112; (c) creating cloning image 114 based on virtual machine 110; and (d) deploying cloning image 114 to target machine 106. Depending on the specific embodiment, cloning image agent 109 can include some or all of the listed code functions (a)-(d). Additionally, cloning image agent 109 can include program code for other processing functionality further discussed below. According to the illustrative embodiment, when processor 205 executes cloning image agent 109, data processing system 200 initiates a series of processes that enable the above functional features as well as additional features or functionality, which are described below with reference to FIGS. 3-4.

Those of ordinary skill in the relevant technology will appreciate that the hardware and basic configuration depicted in FIGS. 1-2 may vary. For example, other devices or components may be used in addition to or in place of the hardware depicted. The depicted, example is not meant to imply architectural limitations with respect to the present invention.

Figure 3:
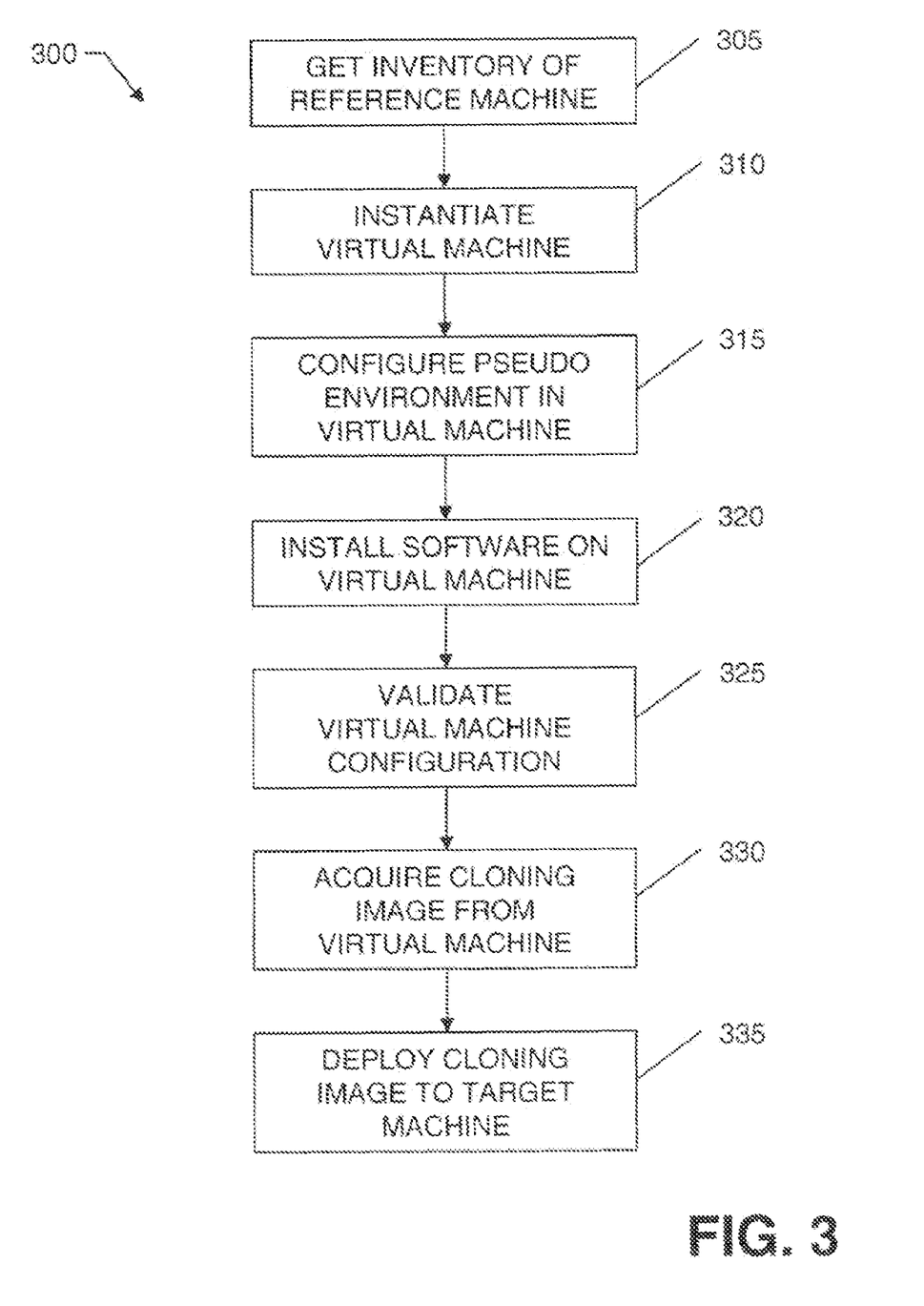
FIG. 3 is a flow chart of a process by which certain functionality of the invention can be implemented.

With reference to FIG. 3 now, a method 300 that can be implemented in networked computing environment 100 and data processing system 200 will be described. Generally, method 300 facilitates the creation and deployment of a cloning image. Involved in the method is the acquisition of an inventory of a reference machine, creation of a virtual machine based on the inventory, and capturing of a cloning image based on the virtual machine. The virtual machine is configured to support a replica, or substantially similar, computing environment of the reference machine. Virtualizing of certain devices present in the reference machine can be provided either by mock objects or by a device's compatibility mode. The following provides additional details of method 300.

In one embodiment, detailed inventory 108 of the physical (hardware) and software assets of reference machine 104 is made and stored in deployment server 102 (305). Inventory 108 preferably includes information regarding hardware, device drivers, BIOS, etc. Inventory 108 can be made at the reference machine 104 and transmitted to deployment server 102. In one embodiment, deployment server 102 transmits instructions to a profiling agent (not shown) of reference machine 104 to assess the hardware and software assets of reference machine 104. The instructions may use one or more utilities provided by the operating system of reference machine 104 to collect the asset information. Reference machine 104 may also use additional third party software components to facilitate the creation of inventory 108. Once the physical and software assets are collected into inventory 108, reference machine 104 transmits inventory 108 to deployment server 102 over the communications network 107. Asset information can be obtained via, for example, the lspci and dmesg commands in Linux, or device managers in Windows Management Interface for Microsoft Windows.

Inventory 108 can include, for example, the number and type of processors 205, the number and specific configuration of each network interface device 255, memory and partition configuration of system memory 210 or storage 250 (including the size of random access memory, number of hard drives, number of partitions, partition types, partition sizes, etc.). Further profiling analysis may include analysis of device drivers, such as disk drivers, hardware abstraction layer, network configuration, as well as analysis of the boot profile. Analysis of the registry is also preferably conducted.

Inventory 108 can include operating system version and configuration information of reference machine 104. The operating system configuration information can include so identification of particular patches, updates, or additional modifications to the identified version of the operating system. Inventory 108 can also include identification of hardware-specific drivers. As part of inventory 108 an identification of running services in reference machine 104 can be collected. Optionally, analysis and profiling of installed programs and settings is also conducted. Also preferably the profile includes state of defragmentation of the disks of reference machine 104.

Based on inventory 108, particularly hardware information, a virtual machine 110 is instantiated (310) in deployment server 102. Creation of virtual machine 110 preferably involves configuring pseudo environment 112 (315), which is a virtual computing environment replicating the hardware configuration of reference machine 104. That is, pseudo environment 112 is configured to closely mimic the hardware environment of reference machine 104. Pseudo environment 112 is created based on information required for operating system installation, such as device name, interrupt requests (IRQs) assignments, peripheral component interconnect bus (PCI) slot number, memory address, etc.

Figure 4:
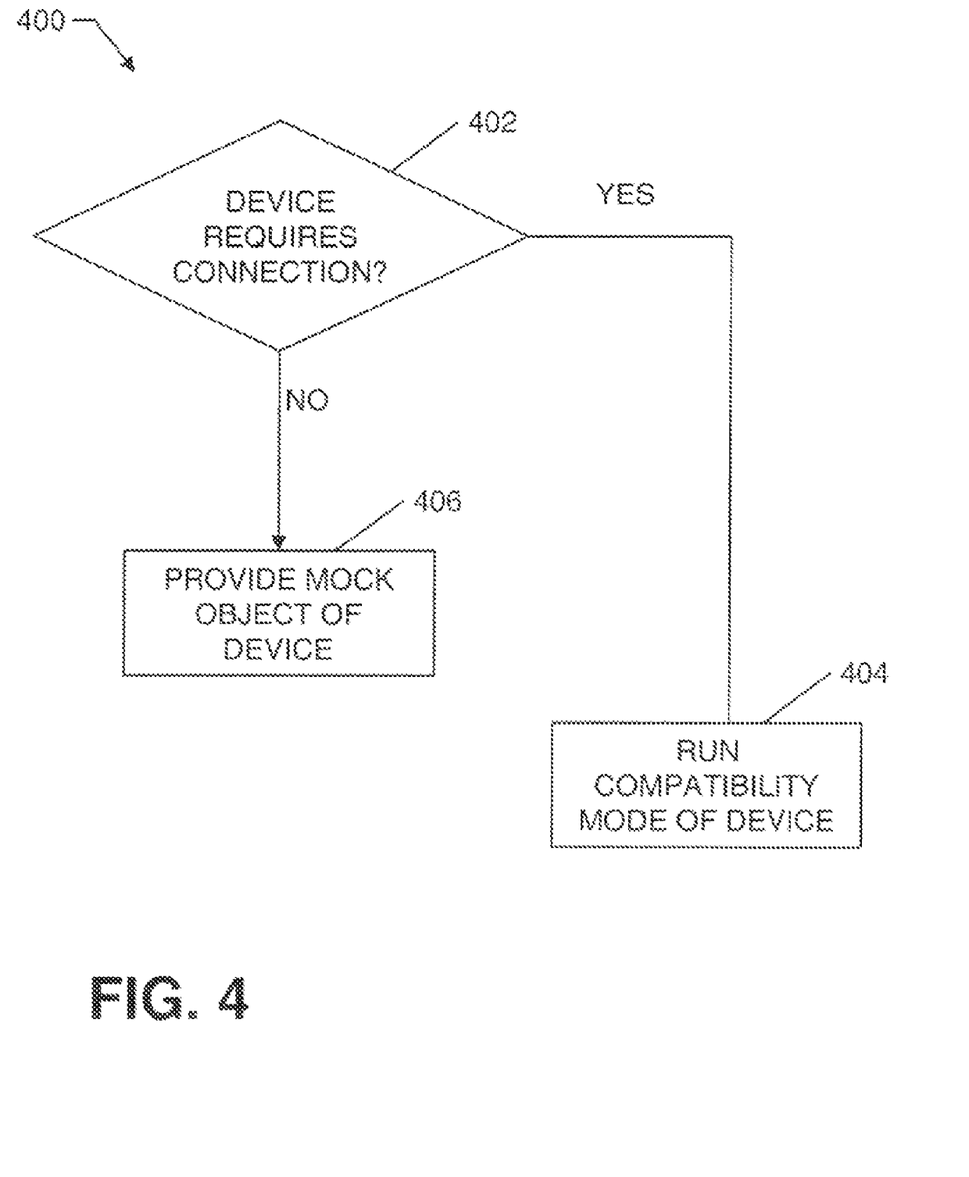
FIG. 4 is another flow chart of a process by which certain functionality of the invention can be implemented.

Referencing FIG. 4, in one embodiment, configuration of pseudo environment 112 may include querying whether a device associated with reference machine 104 is required to be connected to reference machine 104 (402). If the device is required to be connected, a compatibility mode of the device is provided (404) in pseudo environment 112. For example, compatibility modes Video Electronics Standards Association (VESA) mode corresponding to video graphics arrays (VGA, displays), or integrated drive electronics (IDE) mode corresponding to redundant array of independent disks configuration (RAID). The emulators of the devices are installed in pseudo environment 112 as plug in devices. For example, NVemalate for nVidia VGA. If the device is not required to be connected or installed (e.g., a USB device), a mock object is created to virtualize the device (406).

After configuring pseudo-environment 112, the operating system, device drivers, software patches, etc., are installed on virtual machine 110 (320). Optionally, other software which is required for, or useful in, pseudo-environment 112 can be installed. In one embodiment, a replica of the software environment of reference machine 104 is installed in pseudo environment 112. In another embodiment, an upgraded operating system or other software in installed. In yet another embodiment, an operating system of a different type from the type of operating system present in reference machine 104 can be installed in pseudo environment 112 of virtual machine 110. Deployment server 102 can be configured to adjust the configuration of virtual machine 110 to correspond to operating environment differences, driver incompatibilities, or service incompatibilities in relation to the reference machine 104.

In one embodiment, cloning image agent 109 uses a rule base that provides solutions to known configurations or configuration problems. The rule base allows handling of specific known problems or preferred methods of implementations. A rule example is a where driver that is known to be incompatible the hardware of deployment server 102 requires special modification of the deployment server 102 or virtual machine 110 environment. By way of example the modifications may include removal of obsolete drivers, change the HAL and kernel files, modify die boot parameters (boot.ini), etc. Optionally, the cloning image agent 109 can be configured to change the networking parameters of the virtual machine 110, such as IP address and network identification. Other changes may include changing of drivers, removal of drivers and other files and settings that are no longer needed, etc.

After pseudo environment 112 is provided with desired operating system and other software, updates, maintenance, etc., virtual machine 110 can be tested to validate (325) that its operation is acceptable. Having validated virtual machine 110, cloning image 114 is acquired from virtual machine 110 (330). In one embodiment, a logical disk (such as vmdk) of virtual machine 110 can be used as cloning image 114. Cloning image 114 can then be deployed to target machine 106 (335).

It should be noted that the inventive embodiments described allow for the creation of computing environment clones that can be maintained or updated while reference machine 104 continues to execute its normal operations without interruption. Inventive embodiments disclosed here can be used in, for example, testing hardware or software in a prescribed computing environment that is a replica of a reference machine that is in service.

In the flow charts or functional block diagrams above, one or more of the methods can be embodied in a computer writable or readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be former appreciated, the processes in embodiments of the present invention may be implemented using any combination of software, firmware or hardware. As a preparatory step to practicing the invention in software, the programming code (whether software or firmware) will typically be stored in one or more machine readable and writable storage media such as fixed (hard) drives, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to computer instructions coded in accordance with the invention.

While the invention has been described with reference to exemplary embodiments, it will be understood by those skilled in the relevant technology that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc, do not denote any order or importance, but rather the terms first, second, etc. are used to distinguish one element from another.

What is claimed is:

1. A method of creating a cloning image, the method comprising:
   determining an inventory of assets of a reference machine, the assets including hardware devices and software modules;
   instantiating a virtual machine based on the inventory;
   configuring a hardware pseudo-environment in the virtual machine based on device drivers and information required for operating system (OS) installation, said information including at least one of a device name, interrupt request (IRQ), peripheral component interconnect (PCI) slot number, and memory address, wherein the configuring includes:
      creating, in the hardware pseudo-environment, a mock object that virtualizes a hardware device in the inventory not required to be installed or connected to the reference machine;
      in the hardware pseudo-environment, creating and running, in a compatibility mode, virtual devices that virtualize hardware devices in the inventory required to be installed or connected to the reference machine;
   installing at least one of an operating system, device driver, and patch on the virtual machine;
   validating a behavior of at least one of an operating system, device, driver, or patch in the virtual machine;
   acquiring a cloning image from the virtual machine without stopping the reference machine; and
   deploying the cloning image to a target machine.

2. The method of claim 1, wherein instantiating a virtual machine comprises instantiating a virtual machine in a deployment server, said deployment server being a computing device different from the reference machine.

3. The method of claim 1, wherein creating and running, in a compatibility mode, virtual devices that virtualize hardware devices in the inventory required to be installed or connected to the reference machine comprises providing an emulator for a video graphics array device.

4. The method of claim 1, wherein creating and running, in a compatibility mode, virtual devices that virtualize hardware devices in the inventory required to be installed or connected to the reference machine comprises providing an emulator for an integrated drive electronics device.

5. The method of claim 1, wherein the reference machine and the target machine are different computing devices.

6. The method of claim 1, wherein creating a mock object comprises creating a mock object for a universal serial bus (USB) device.

7. A data processing system for creating a cloning image, the data processing system comprising:
   at least one processor configured to execute computer instructions;
   a memory coupled to the processor; and
   computer instructions stored in said memory, wherein when the processor executes said computer instructions the data processing system performs:
      determining an inventory of assets of a reference machine, the assets including hardware devices and software modules;
      instantiating a virtual machine based on the inventory;
      configuring a hardware pseudo-environment in the virtual machine based on device drivers and information required for operating system (OS) installation, said information including at least one of a device name, interrupt request (IRQ), peripheral component interconnect (PCI) slot number, and memory address, wherein the configuring includes:
         creating, in the hardware pseudo-environment, a mock object that virtualizes a hardware device in the inventory not required to be installed or connected to the reference machine;
         in the hardware pseudo-environment, creating and running, in a compatibility mode, virtual devices that virtualize hardware devices in the inventory required to be installed or connected to the reference machine;
      installing at least one of an operating system, device driver, and patch on the virtual machine;
      validating a behavior of at least one of an operating system, device, driver, or patch in the virtual machine;

acquiring a cloning image from the virtual machine without stopping the reference machine; and deploying the cloning image to a target machine.

8. The data processing system of claim 7, wherein instantiating a virtual machine comprises instantiating a virtual machine in a deployment server, said deployment server being a computing device different from the reference machine.

9. The data processing system of claim 7, wherein creating and running, in a compatibility mode, virtual devices that virtualize hardware devices in the inventory required to be installed or connected to the reference machine comprises providing an emulator for a video graphics array device.

10. The data processing system of claim 7, wherein creating and running, in a compatibility mode, virtual devices that virtualize hardware devices in the inventory required to be installed or connected to the reference machine comprises providing an emulator for an integrated drive electronics device.

11. The data processing system of claim 7, wherein the reference machine and the target machine are different computing devices.

12. The data processing system of claim 7, wherein creating a mock object comprises creating a mock object for a universal serial bus (USB) device.

13. A computer program product, comprising:

a computer-readable storage medium program code, stored within the computer-readable store medium, that when executed by a data processing system enables the data processing system to perform:

determining an inventory of assets of a reference machine, the assets including hardware devices and software modules;

instantiating a virtual machine based on the inventory;

configuring a hardware pseudo-environment in the virtual machine based on device drivers and information required for operating system (OS) installation, said information including at least one of a device name, interrupt request (IRQ), peripheral component interconnect (PCI) slot number, and memory address, wherein the configuring includes:

creating, in the hardware pseudo-environment, a mock object that virtualizes a hardware device in the inventory not required to be installed or connected to the reference machine;

in the hardware pseudo-environment, creating and running, in a compatibility mode, virtual devices that virtualize hardware devices in the inventory required to be installed or connected to the reference machine;

installing at least one of an operating system, device driver, and patch on the virtual machine;

validating a behavior of at least one of an operating system, device, driver, or patch in the virtual machine;

acquiring a cloning image from the virtual machine without stopping the reference machine; and deploying the cloning image to a target machine.

14. The computer program product of claim 13, wherein instantiating a virtual machine comprises instantiating a virtual machine in a deployment server, said deployment server being a computing device different from the reference machine.

15. The computer program product of claim 13, wherein creating and running, in a compatibility mode, virtual devices that virtualize hardware devices in the inventory required to be installed or connected to the reference machine comprises providing an emulator for a video graphics array device.

16. The computer program product of claim 13, wherein creating and running, in a compatibility mode, virtual devices that virtualize hardware devices in the inventory required to be installed or connected to the reference machine comprises providing an emulator for an integrated drive electronics device.

17. The computer program product of claim 13, wherein creating a mock object comprises creating a mock object for a universal serial bus (USB) device.

\* \* \* \* \*